(12) United States Patent
Lim et al.

(10) Patent No.: US 7,672,081 B2
(45) Date of Patent: Mar. 2, 2010

(54) PERPENDICULAR MAGNETIC RECORDING HEAD

(75) Inventors: Chee-kheng Lim, Suwon-si (KR); Eun-sik Kim, Seoul (KR); Yong-su Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 758 days.

(21) Appl. No.: 11/503,296

(22) Filed: Aug. 14, 2006

(65) Prior Publication Data
US 2007/0035884 A1    Feb. 15, 2007

(30) Foreign Application Priority Data
Aug. 13, 2005    (KR) .................. 10-2005-0074571

(51) Int. Cl.
*G11B 5/127* (2006.01)

(52) U.S. Cl. .................................. 360/125.3; 360/128

(58) Field of Classification Search ................................
360/125.02–125.32, 128
See application file for complete search history.

(56) References Cited

U.S. PATENT DOCUMENTS

| | | | |
|---|---|---|---|
| 5,815,342 A * | 9/1998 | Akiyama et al. | 360/97.01 |
| 6,667,848 B1 * | 12/2003 | Khizroev et al. | 360/125.16 |
| 6,671,117 B2 * | 12/2003 | Dimitrov et al. | 360/57 |
| 6,813,115 B2 * | 11/2004 | Van der Heijden et al. | 360/125.12 |
| 6,876,519 B1 * | 4/2005 | Litvinov et al. | 360/125.15 |
| 7,070,716 B2 * | 7/2006 | Lam | 360/125.04 |
| 7,337,530 B1 * | 3/2008 | Stoev et al. | 29/603.07 |
| 2003/0021070 A1 * | 1/2003 | Ohtsu et al. | 360/317 |
| 2004/0228030 A1 * | 11/2004 | Mochizuki et al. | 360/125 |
| 2006/0002018 A1 * | 1/2006 | Fukui et al. | 360/125 |
| 2006/0119981 A1 * | 6/2006 | Li et al. | 360/125 |
| 2006/0187580 A1 * | 8/2006 | Samofalov et al. | 360/125 |

FOREIGN PATENT DOCUMENTS

| | | | |
|---|---|---|---|
| JP | 55004722 A | * | 1/1980 |
| JP | 57208623 A | * | 12/1982 |
| JP | 57208625 A | * | 12/1982 |
| JP | 63058604 A | * | 3/1988 |
| JP | 2000-251227 A | | 9/2000 |
| KR | 10-0302691 B1 | | 7/2001 |
| WO | WO 96/16339 A1 | | 5/1996 |

* cited by examiner

*Primary Examiner*—William J Klimowicz
(74) *Attorney, Agent, or Firm*—Sughrue Mion, PLLC

(57) ABSTRACT

A perpendicular magnetic recording head which moves in a track direction of a recording layer of a perpendicular magnetic recording medium to write information on the recording layer or read information from the recording layer. The perpendicular magnetic recording head includes: the perpendicular magnetic recording medium including a soft magnetic underlayer and the recording layer; a write head including a main pole that applies a magnetic field to, and writes information to, the recording layer and a return pole having a first end which is connected to the main pole and having a second end which is spaced apart from the main pole over an air bearing surface (ABS) of the perpendicular magnetic recording head which is adjacent to the recording layer; and a permanent magnet formed on at least one side of the write head.

11 Claims, 7 Drawing Sheets

PERPENDICULAR MAGNETIC RECORDING HEAD

CROSS-REFERENCE TO RELATED PATENT APPLICATION

This application claims priority from Korean Patent Application No. 10-2005-0074571, filed on Aug. 13, 2005, in the Korean Intellectual Property Office, the disclosure of which is incorporated herein in its entirety by reference.

BACKGROUND OF THE INVENTION

1. Field of the Invention

Apparatuses consistent with the present invention relate to a perpendicular magnetic recording head, and more particularly, to a perpendicular magnetic recording head in which a magnetic material is formed to control the magnetization direction of a soft magnetic underlayer of a perpendicular magnetic recording medium.

2. Description of the Related Art

With the advent of the Information Age, the amount of digital information that a person or organization deals with has significantly increased. For example, many people use computers that have high data processing speeds and large information storage capacities to access the Internet and obtain various pieces of information. Central processing unit (CPU) chips and computer peripheral units have been improved to enhance the speed of data processing in computers, and various types of high density information storage media like hard disks are being developed to enhance data storage capabilities of computers.

Recently, various types of recording media have been introduced. Most of the recording media use a magnetic layer as a data recording layer. Data recording types for magnetic recording media can be classified into longitudinal magnetic recording and perpendicular magnetic recording.

In longitudinal magnetic recording, data is recorded using the parallel alignment of the magnetization of the magnetic layer on a surface of the magnetic layer. In perpendicular magnetic recording, data is recorded using the perpendicular alignment of the magnetization of the magnetic layer on a surface of the magnetic layer. From the perspective of data recording density, the perpendicular magnetic recording is more advantageous than the longitudinal magnetic recording.

FIG. 1A is a cross-sectional view of a conventional perpendicular magnetic recording head. Referring to FIG. 1A, the conventional magnetic recording head includes a perpendicular magnetic recording medium 10, a write head 100 writing data on the recording medium 10, and a read head 110 reading data from the perpendicular magnetic recording medium 10.

The write head 100 includes a main pole P1, a return pole P2, and a coil C. The main pole P1 and the return pole P2 may be formed of a magnetic material, e.g., NiFe, and may have different coercivities due to different compositions. The main pole P1 and the return pole P2 are directly used to write data on a recording layer 13 of the perpendicular magnetic recording medium 10. An auxiliary pole 101 may be formed on a side of the main pole P1 to concentrate the magnetic field generated in the main pole P1 while data is recorded in a selected region of the perpendicular magnetic recording medium 10. The coil C surrounds the main pole P1 and generates a magnetic field.

The read head 110 includes first and second magnetic shield layers S1 and S2 and a data reading magnetoresistance device 111 positioned between the first and second magnetic shield layers S1 and S2. While data is read from a predetermined area of a selected track, the first and second shield layers S1 and S2 shield the magnetic field generated by magnetic elements near the magnetoresistance device 111 from affecting the predetermined area. The data reading magnetoresistance device 111 may be a giant magnetoresistance (GMR) device or a tunneling magnetoresistance (TMR) device.

FIG. 1B is an enlarged view of portion A of FIG. 1A. A method of recording information on the perpendicular magnetic recording medium 10 will now be explained with reference to FIG. 1B. The magnetic field applied from the main pole P1 due to the coil C magnetizes the recording layer 13 in a perpendicular Z-axis direction to record data. The magnetic field passes through an intermediate layer 12 and a soft magnetic underlayer 11 and returns to the return pole P2. The perpendicular magnetic recording medium 10 travels in an X-axis direction continuously having information recorded on a predetermined track. Magnetic domains with independent magnetization directions are formed in the soft magnetic underlayer 11 made of a magnetic material. The magnetic field applied from the main pole P1 and passing through the soft magnetic underlayer 11 affects the magnetic domains of the soft magnetic underlayer 11 thereby changing the magnetization directions thereof. After data is recorded on the recording layer 13, the magnetic domains with the changed magnetization directions in the soft magnetic underlayer 11 may change the magnetization directions of magnetic domains in the recording layer 13. In this case, the data retention characteristics of the recording layer 13 are degraded. Furthermore, the changed magnetization direction of the domains in the soft magnetic underlayer 11 leads to formation of magnetic domain walls. And such kind of domain walls formation is highly undesirable since it generate magnetic noise signal during the reading process.

Accordingly, there is an attempt to fix the magnetization direction of the soft magnetic underlayer 11 by forming an antiferromagnetic layer made of IrMn, a ferromagnetic layer made of NiFe, and a spacer layer made of Ru under the soft magnetic underlayer 11. However, such an attempt increases the thickness of the perpendicular magnetic recording medium 10, thereby increasing the thickness of a storage medium using multi-layered disks and complicating manufacturing processes. This also increases the manufacturing cost and complexity. Also, since the coupling constant between the ferromagnetic layer and the soft magnetic underlayer 11 is small, it is difficult to fix the magnetization direction of the soft magnetic underlayer 11.

SUMMARY OF THE INVENTION

The present invention provides a perpendicular magnetic recording head configured such that the influence of a soft magnetic underlayer on a recording layer of a magnetic recording medium can be minimized.

According to an aspect of the present invention, there is provided a perpendicular magnetic recording head that moves in a track direction of a recording layer of a perpendicular magnetic recording medium. Here, the perpendicular magnetic recording head comprises: the perpendicular magnetic recording medium including a soft magnetic underlayer and the recording layer; a write head including a main pole that applies a magnetic field and writes information on the recording layer and a return pole having a first end which is connected to the main pole and a second end which is spaced apart from the main pole over an air bearing surface (ABS) of the perpendicular magnetic recording head which is adjacent to the recording layer; and at least one permanent magnet formed on at least one side of the write head.

The permanent magnet may be formed in the track direction of the write head.

The permanent magnet may be formed on both sides of the write head in the track direction.

A remnant magnetization of the permanent magnet may be less than 0.4 T.

The permanent magnet may include at least one of NbFeB, AlNiCo, Ferrite, and a rare-earth magnetic material.

The perpendicular magnetic recording head may further comprise at least one side shield formed on both sides of the permanent magnet in the track direction.

A magnetic field applied from the permanent magnet to the soft magnetic underlayer may be greater than 0.01 T.

A magnetic field applied from the permanent magnet to the recording layer may be less than 0.05 T.

A height of the permanent magnet from the ABS of the perpendicular magnetic recording head may be greater than 0.2 nm.

BRIEF DESCRIPTION OF THE DRAWINGS

The above and other aspects of the present invention will become more apparent by describing in detail exemplary embodiments thereof with reference to the attached drawings, in which.

DETAILED DESCRIPTION OF EXEMPLARY EMBODIMENTS

Figure 1A:
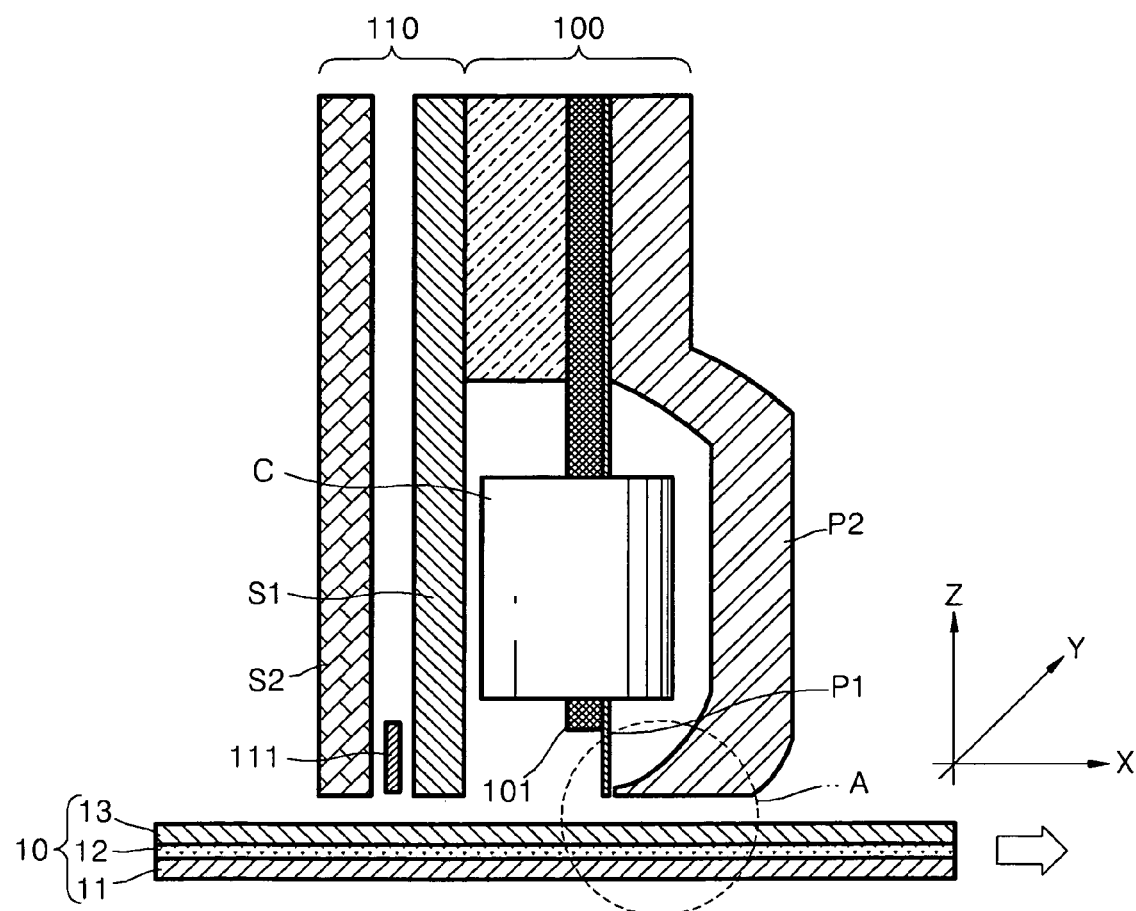
FIG. 1A is a cross-sectional view of a conventional perpendicular magnetic recording head.
Figure 1B:
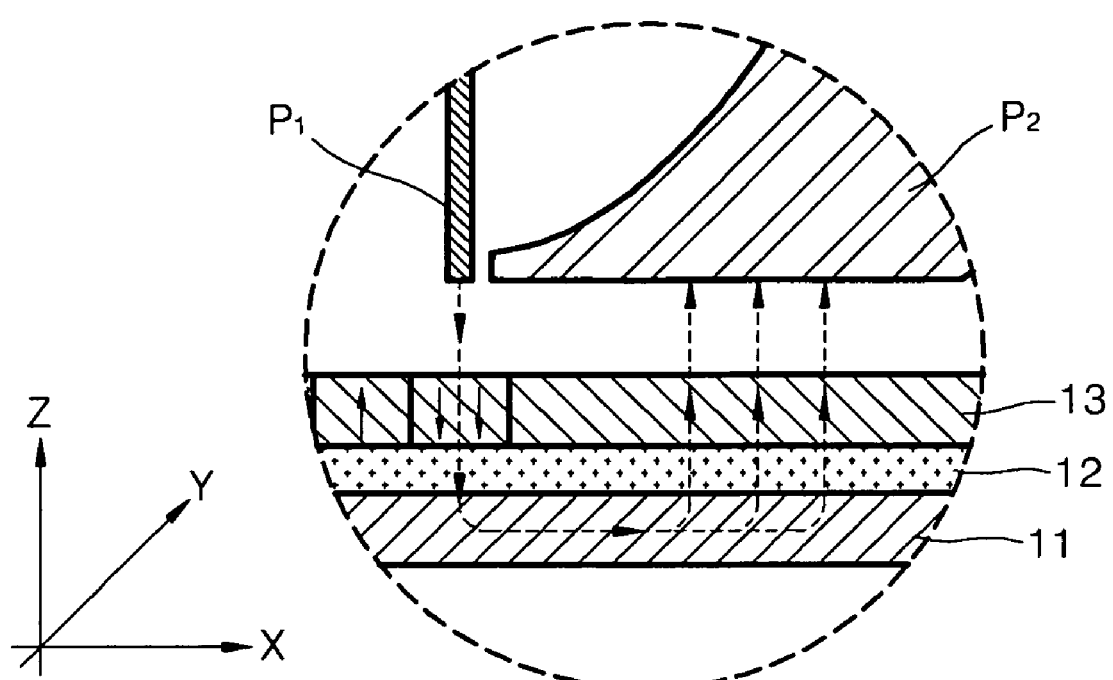
FIG. 1B is an enlarged view of portion A of FIG. 1A.

The present invention will now be described more fully with reference to the accompanying drawings, in which exemplary embodiments of the invention are shown. The thicknesses of layers or regions in the drawings are exaggerated for clarity.

Figure 2A:
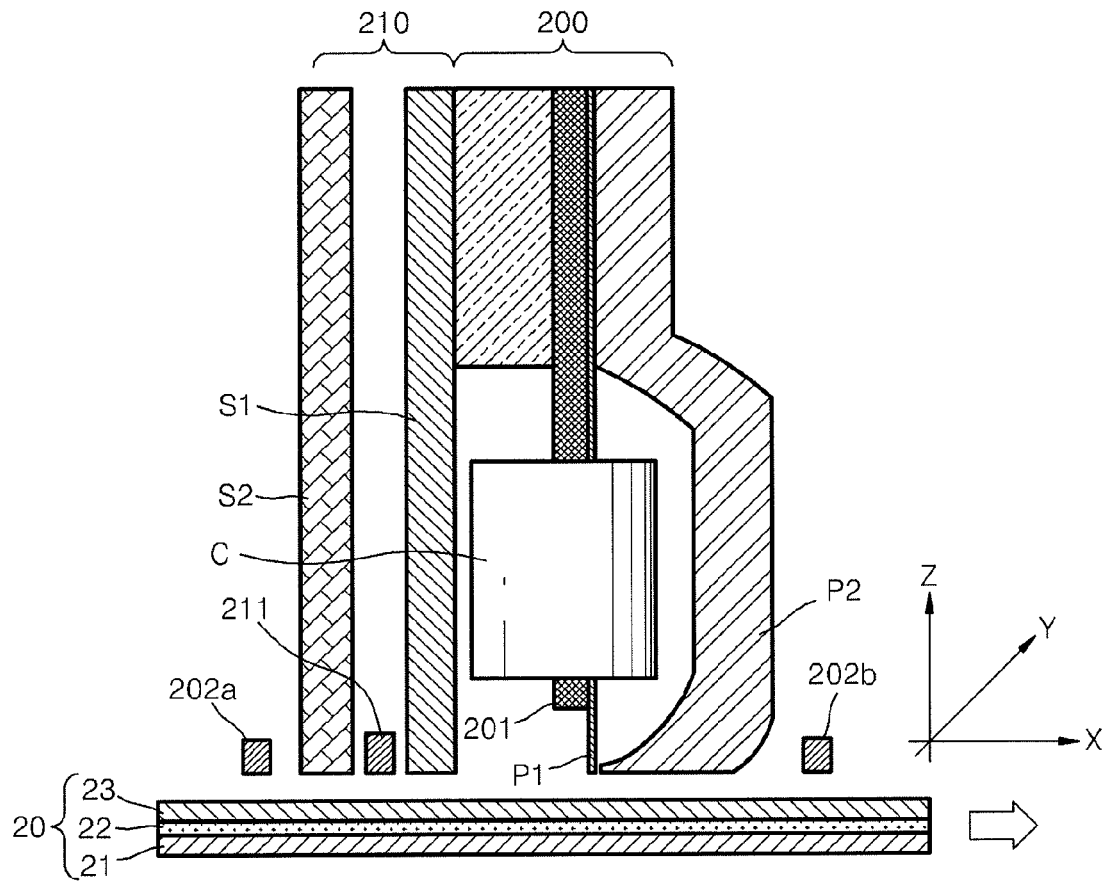
FIG. 2A is a cross-sectional view of a perpendicular magnetic recording head according to an exemplary embodiment of the present invention.

FIG. 2A is a cross-sectional view of a perpendicular magnetic recording head according to an exemplary embodiment of the present invention. Referring to FIG. 2A, the perpendicular magnetic recording head includes a perpendicular magnetic recording medium 20 (referred to as recording medium hereinafter), a write head 200 for writing data on the recording medium 20, and a read head 210 for reading data from the recording medium 20. The recording medium 20 includes a soft magnetic underlayer 21, an intermediate layer 22, and a recording layer 23. In FIG. 2A, an X-axis denotes a track direction of the recording layer 23 of the recording medium 20, and a Y-axis denotes a cross-track direction.

The write head 200 includes a main pole P1, a return pole P2, and a coil C. The main pole P1 and the return pole P2 write data on the recording layer 23 of the recording medium 20. An auxiliary pole 201 may be formed on a side of the main pole P1. The coil C surrounds the main pole P1, and generates a magnetic field in the main pole P1 to magnetize the recording layer 23 of the recording medium 20. The read head 210 includes first and second magnetic shield layers SI and S2 and a data reading magnetoresistance device 211 positioned between the first and second magnetic shield layers S1 and S2. While data is read from a predetermined area of a selected track, the first and second magnetic shield layers SI and S2 block a magnetic field generated by magnetic elements near the data reading magnetoresistance device 211 from reaching the predetermined area. The data reading magnetoresistance device 211 may be a giant magnetoresistance (GMR) or tunneling magnetoresistance (TMR) device.

The perpendicular magnetic recording head of the present exemplary embodiment is characterized in that permanent magnets 202a and 202b are formed on one or more sides in the track direction (X-axis) of the write head 200. Referring to FIG. 2A, the permanent magnets 202a and 202b are disposed on a left (should be the back side) side of the read head 210 and on a right (should be the front side) side of the write head 200 in the track direction, respectively. However, if the first permanent magnet 202a is disposed on a front side of the main pole P1 in the track direction, the first permanent magnet 202a may be formed in any place irrespective of the position of the magnetoresistance device 211. However, the first permanent magnet 202a should be disposed so that the magnetic field of the first permanent magnet 202a does not affect other magnetic elements. The first and second permanent magnets 202a and 202b may include at least one of NbFeB, AlNiCo, Ferrite, and a rare-earth material such as SmCo. The magnetization directions of the first and second permanent magnets 202a and 202b may be equal to the cross-track direction of the recording layer 23 of the recording medium 20.

Figure 2B:
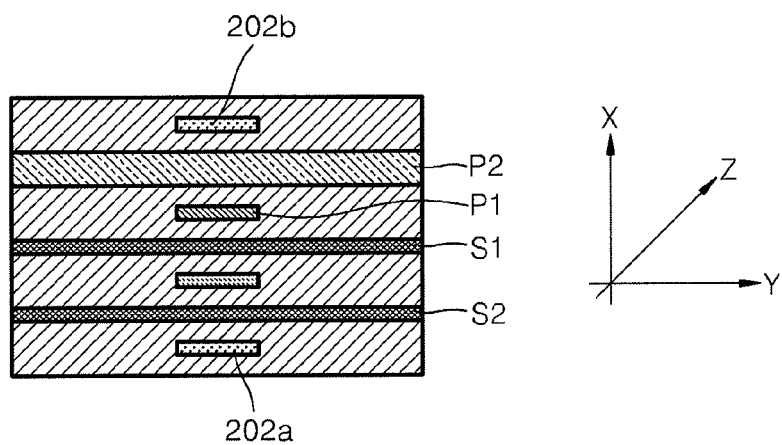
FIG. 2B is a cross-sectional view illustrating an air bearing surface of the perpendicular magnetic recording head of FIG. 2A.

FIG. 2B is a cross-sectional view illustrating an air bearing surface (ABS) of the magnetic head of FIG. 2A. Referring to FIG. 2B, the first and second permanent magnets 202a and 202b are formed on both sides of the read head 210 and write head 200 in the track direction (X-axis). An insulating material surrounds each of the first and second permanent magnets 202a and 202b. The write head 200 and the read head 210 may be commonly used magnetic heads, and the perpendicular magnetic recording head of the present exemplary embodiment may be manufactured using a conventional manufacturing method by simply adding the first permanent magnet 202a before forming the magnetic heads and adding the second permanent magnet 202b after forming the return pole P2.

When the first and second permanent magnets 202a and 202b are formed, an external magnetic field may be applied to cause magnetization in the cross-track direction of the recording layer 23 of the recording medium 20. Also, after the first and second permanent magnets 202a and 202b are formed, an external magnetic field may be applied to fix the magnetization directions of the first and second permanent magnets 202a and 202b. In detail, if an external magnetic field is applied into a process chamber in which at least one of NbFeB, AlNiCo, Ferrite, and a rare-earth material such as SmCo is formed on a substrate by sputtering, the magnetic materials are magnetized in a direction in which the external magnetic field is applied.

Figure 3A:
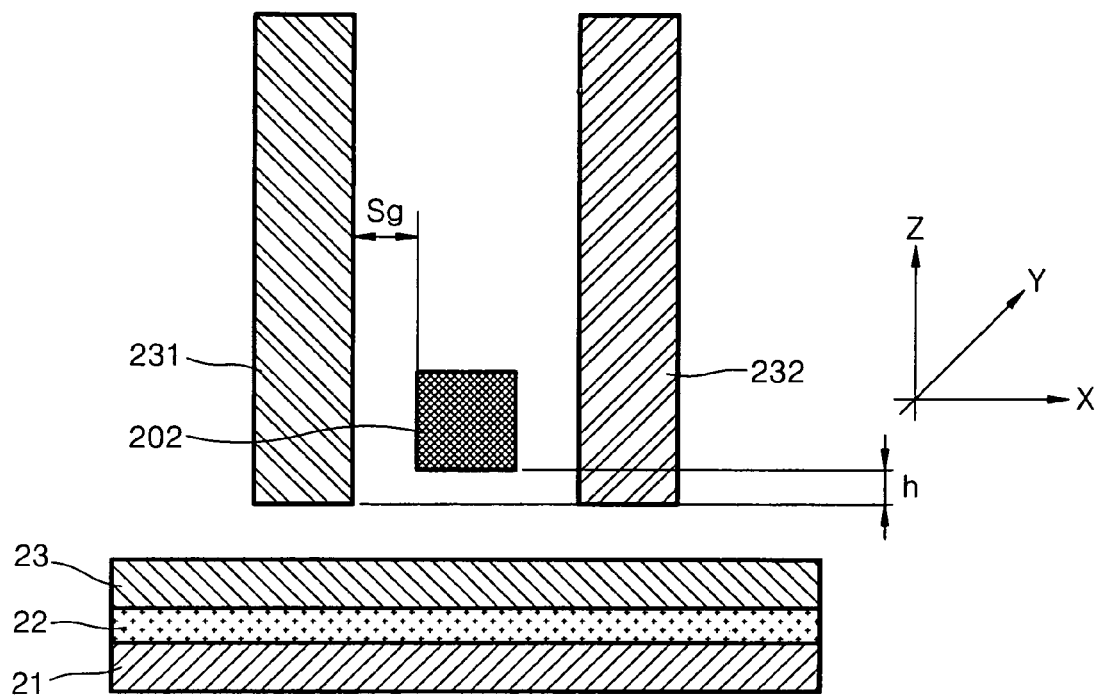
FIG. 3A is a cross-sectional view illustrating a permanent magnet and side shields of the perpendicular magnetic recording head of FIG. 2A in a track direction of a recording medium.

FIG. 3A is a cross-sectional view illustrating the first permanent magnet 202a or the second permanent magnet 202b of the perpendicular magnetic recording head of FIG. 2A in the track direction (X-axis). Here, the first and second permanent magnets 202a and 202b are collectively indicated by reference numeral 202. Referring to FIG. 3A, side shields 231 and 232 are formed on both sides of the permanent magnet 202.

The side shields 231 and 232 optimize the influence of the permanent magnet 202 on the recording medium 20. The side shields 231 and 232 may be formed of a soft magnetic material and may be formed on both sides of the permanent magnet 202 in the track direction. The second magnetic shield layer 52 may be used as the side shield 232. The distance between each of the side shields 231 and 232 and the permanent magnet 202 (Sg) may range from 100 to 500 nm. The height of the permanent magnet 202 above the ABS of the side shields 231 and 232 (h) that face the recording layer 23 of the recording medium 20 may be greater than 25 nm.

Figure 3B:
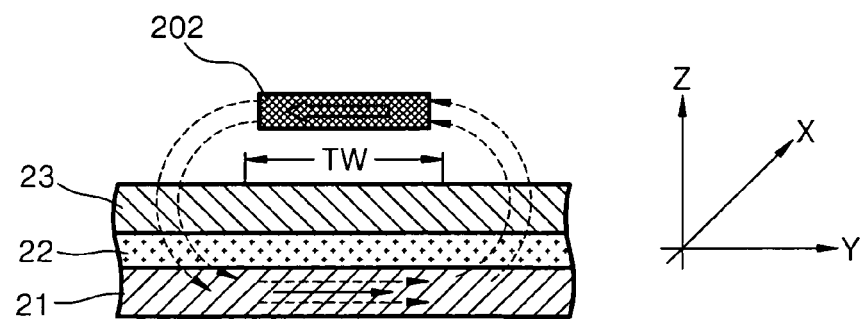
FIG. 3B is a cross-sectional view illustrating a magnetic field that is generated by the permanent magnet of the perpendicular magnetic recording head of FIG. 2A and that magnetically affects the recording medium.

FIG. 3B is a cross-sectional view illustrating the magnetic field that is generated by the permanent magnet 202 of the perpendicular magnetic recording head of FIG. 2A and that affects the recording medium 20. Referring to FIG. 3B, the permanent magnet 202 is magnetized in the cross-track direction (Y-axis) of the recording layer 23. The magnetic field applied from the permanent magnet 202 does not affect a track area of the recording layer 23, but magnetizes the soft magnetic underlayer 21 in the cross-track direction (Y-axis). When the soft magnetic underlayer 21 is magnetized in the cross-track direction, the influence of the soft magnetic underlayer 21 on the magnetic domains of the recording layer 23 which are magnetized in the perpendicular direction can be reduced. The magnetized soft magnetic underlayer also reduce the magnetic domain wall noise during the reading process. The magnetic domain wall is moved away by the magnetic field from the permanent magnet 202.

Referring to FIGS. 2A and 3B, the recording medium 20 travels in the X-axis, and the first permanent magnet 202a first fixes the magnetization direction of the soft magnetic underlayer 21 to the cross-track direction (Y-axis). When information is written on the recording layer 23 by the main pole P1, the magnetization direction of the soft magnetic underlayer 21 is forced to change to the track direction (X-axis), but the second permanent magnet 202b fixes again the magnetization direction of the soft magnetic underlayer 21 to the cross-track direction (Y-axis). At this time, the magnetic field flowing through the recording layer 23 exits between tracks outside a track width TW of the recording layer 23 such that the influence on the recording layer 23 can be minimized.

Figure 4:
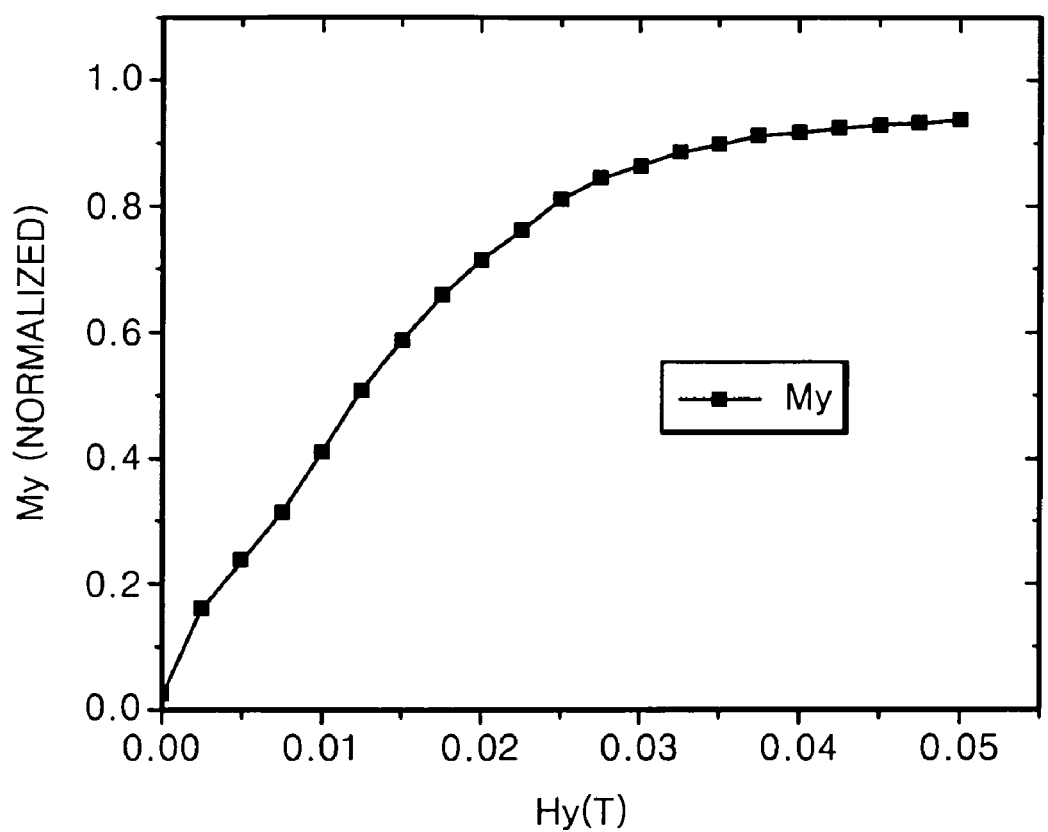
FIG. 4 is a graph illustrating a relation between the strength Hy in tesla (T) of a magnetic field and the proportion My of magnetic domains magnetized in a cross-track direction (Y-axis) when the magnetic field is applied to magnetic domains of a soft magnetic underlayer which are magnetized by a magnetic field of 100 Oe according to an exemplary embodiment of the present invention.

FIG. 4 is a graph illustrating a relation between the strength Hy in tesla (T) of a magnetic field and the proportion My of magnetic domains magnetized in the cross-track direction when the magnetic field is applied to the magnetic domains of the soft magnetic underlayer 21 which are magnetized by a magnetic field of 100 Oe.

Referring to FIG. 4, when a magnetic field of 0.01 T is applied, the magnetization directions of 40% or more of the magnetic domains of the soft magnetic underlayer 21 are changed to the Y-axis. When the magnetization directions of 40% or more of the magnetic domains of the soft magnetic underlayer 21 are fixed to the Y-axis, that is, to the cross-track direction of the recording medium 20, the influence on the recording layer 23 can be reduced significantly. Accordingly, it is preferable, but not necessary, that the strength of the magnetic field applied from the permanent magnet 202 to the soft magnetic underlayer 21 be greater than 0.01 T.

Figure 5:
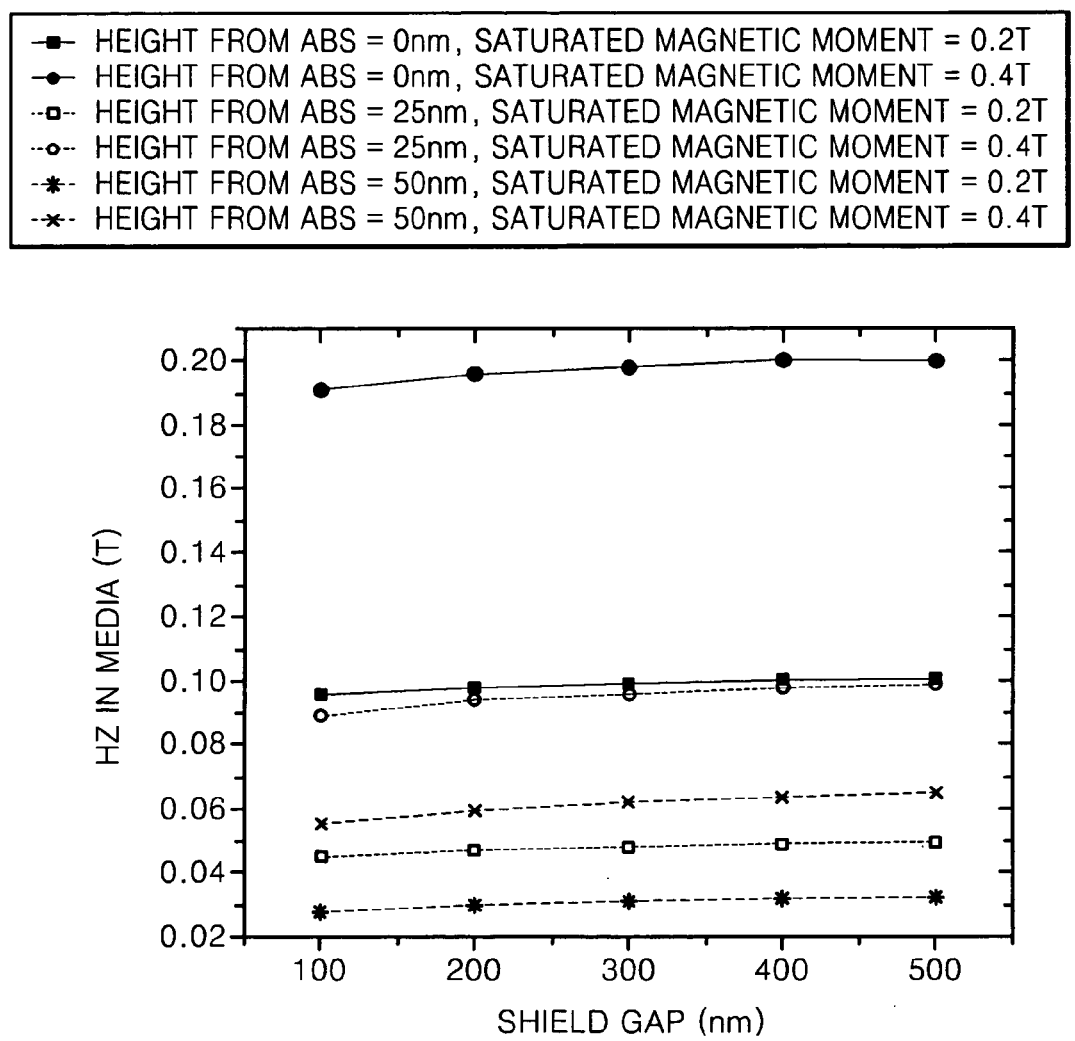
FIG. 5 is a graph illustrating the strength of a magnetic field flowing through magnetic domains of a recording layer due to the magnetic field applied by the permanent magnet of the perpendicular magnetic recording head of FIG. 2A according to an exemplary embodiment of the present invention.

FIG. 5 is a graph illustrating a relation between a shield gap Sg, between the permanent magnet 202 and each of the side shields 231 and 232 (see FIG. 3A), and a magnetic field Hz affecting the recording layer 23 to obtain the influence of the magnetic field applied from the permanent magnet 202 of the perpendicular magnetic recording head of FIG. 2A on the magnetic domains of the recording layer 23. Here, the height h of the permanent magnet 202 from the ABS is set to 0, 25, and 50 nm and the remnant magnetization M of the permanent magnet 202 is set to 0.2 and 0.4 T.

Referring to FIG. 5, when the height h of the permanent magnet 202 from the ABS is 0 nm, the magnetic field affecting the recording layer 23 of the recording medium 20 is relatively high. Also, when the strength of the magnetic field of the permanent magnet 202 is 0.4 T, the magnetic field affecting the recording layer 23 is high. Accordingly, it is preferable, but not necessary, that the remnant magnetization M of the permanent magnet 202 be less than 0.4 T. When the height of the permanent magnet 202 from the ABS is 25 nm or greater and the remnant magnetization M is 0.4 T or less, then the strength of the magnetic field affecting the recording layer 23 is less than 0.05 T.

Figure 6:
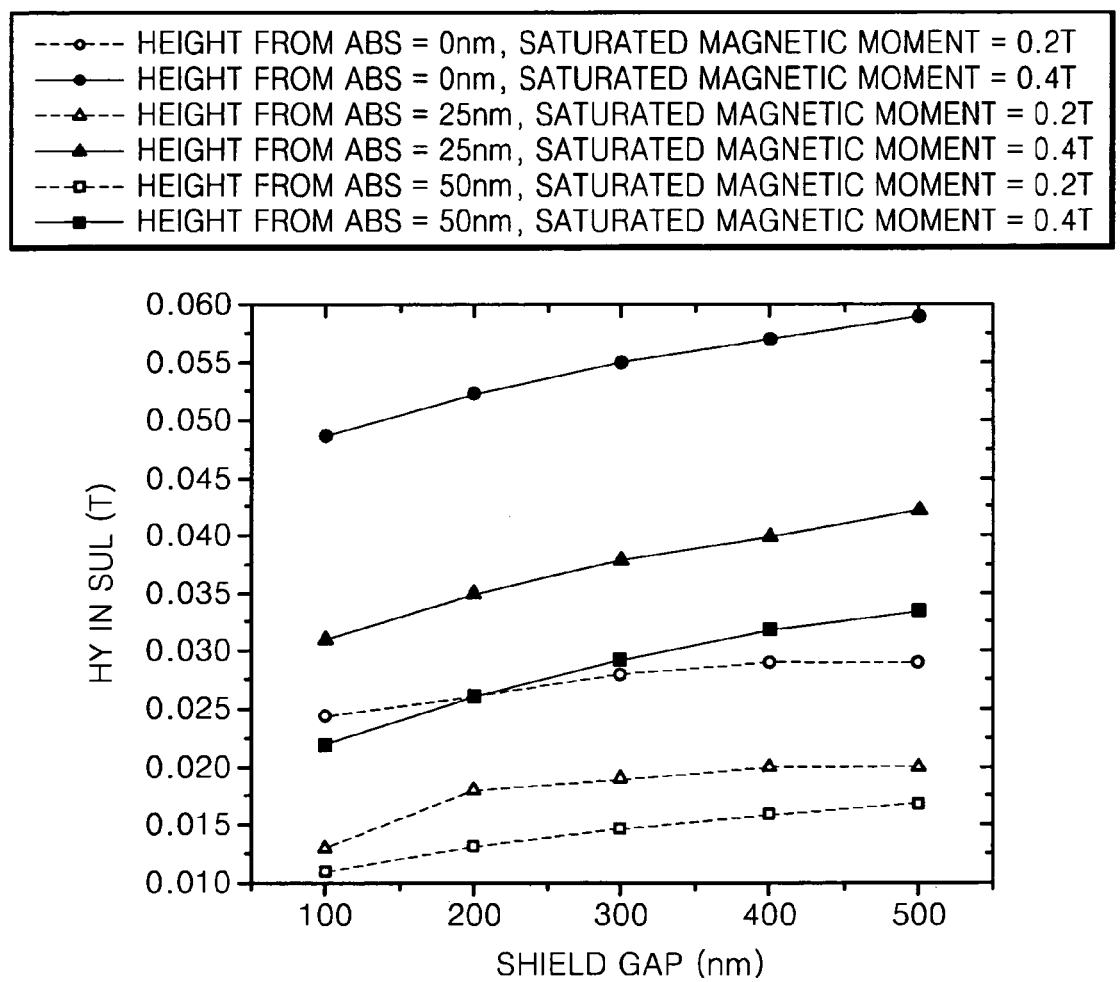
FIG. 6 is a graph illustrating the strength of a magnetic field flowing through the soft magnetic underlayer due to the magnetic field applied by the permanent magnet of the perpendicular magnetic recording head of FIG. 2A according to an exemplary embodiment of the present invention.

FIG. 6 is a graph illustrating the strength of a magnetic field flowing through the soft magnetic underlayer 21 due to the magnetic field applied from the permanent magnet 202 of the perpendicular magnetic recording head of FIG. 2A. The X-axis denotes the distance, that is, the shield gap Sg, between the permanent magnet 202 and each of the side shields 231 and 232, and the Y-axis denotes the strength T of the magnetic field flowing through the soft magnetic underlayer 21 in the cross-track direction (Y-axis). The remnant magnetization M of the permanent magnet 202 is set to 0.2 and 0.4 T.

Referring to FIG. 6, when the shield gap Sg ranges from 100 to 500 nm, a magnetic field of 0.01 T or more flows through the soft magnetic underlayer 21. When the height of the permanent magnet 202 from the ABS is 0, 25, or 50 nm, a magnetic field of 0.01 T or more flows through the soft magnetic underlayer 21.

As a result, when the remnant magnetization M of the permanent magnet 202 is less than 0.4 T, the influence on the magnetic domains of the recording layer 23 can be reduced and the soft magnetic underlayer 21 can be effectively magnetized in the cross-track direction. To minimize the influence on the recording layer 23, the height of the permanent magnet 202 from the ABSs may be greater than 0, and preferably, but not necessarily, 20 nm.

As described above, the perpendicular magnetic recording head of the present invention can fix the magnetization directions of the magnetic domains of the soft magnetic underlayer 21 to the cross-track direction without affecting the recording characteristics of the magnetic domains of the recording layer 23. Accordingly, the magnetic domains of the soft magnetic underlayer 21 can be prevented from corrupting the magnetization direction of the recording layer 23 and reduce the magnetic domain wall noise during the reading process, and thus the retention characteristics and signal reliability of the recording medium 20 can be greatly improved.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A perpendicular magnetic recording head which moves in a track direction of a recording layer of a perpendicular magnetic recording medium, the perpendicular magnetic recording medium comprising a soft magnetic underlayer and the recording layer, the perpendicular magnetic recording head comprising:
    a write head comprising a main pole which applies a magnetic field and writes information on the recording layer and a return pole comprising a first end which is connected to the main pole and a second end which is spaced apart from the main pole over an air bearing surface (ABS) of the perpendicular magnetic recording head which is adjacent to the recording layer; and
    at least one permanent magnet formed on at least one side of the write head,
    wherein said at least one permanent magnet is formed on both sides of the write head in the track direction, wherein each of said at least one permanent magnet is magnetized in a cross-track direction.

2. The perpendicular magnetic recording head of claim 1, wherein the permanent magnet is formed in the track direction of the write head.

3. The perpendicular magnetic recording head of claim 1, wherein a remnant magnetization of the permanent magnet is less than 0.4 T.

4. The perpendicular magnetic recording head of claim 1, wherein the permanent magnet comprises at least one of NbFeB, AlNiCo, Ferrite, and a rare-earth magnetic material.

5. The perpendicular magnetic recording head of claim 1, further comprising at least one side shield formed on both sides of the permanent magnet in the track direction.

6. The perpendicular magnetic recording head of claim 5, wherein strength of a magnetic field applied from permanent magnet to the soft magnetic underlayer varies according to a distance between the side shield and the permanent magnet.

7. The perpendicular magnetic recording head of claim 6, further comprising a read head comprising:
    a plurality of magnetic shield layers;
    a data reading magnetoresistance device which is positioned between the magnetic shield layers, and reads the information on the recording layer,
    wherein one of the magnetic shield layers is one of the at least one side shield.

8. The perpendicular magnetic recording head of claim 1, wherein the permanent magnet is magnetized in a substantially perpendicular direction to a magnetized direction of the recording layer.

9. The perpendicular magnetic recording head of claim 1, wherein a magnetic field applied from the permanent magnet to the soft magnetic underlayer is greater than 0.01 T.

10. The perpendicular magnetic recording head of claim 1, wherein a magnetic field applied from the permanent magnet to the recording layer is less than 0.05 T.

11. The perpendicular magnetic recording head of claim 10, wherein a height of the permanent magnet from the ABS of the perpendicular magnetic recording head is greater than 0.2 nm.

* * * * *